(12) United States Patent
Jones et al.

(10) Patent No.: US 10,712,573 B2
(45) Date of Patent: Jul. 14, 2020

(54) METHODS AND DEVICES FOR DEMOUNTABLE HEAD MOUNTED DISPLAYS

(71) Applicants: Frank Jones, Carp (CA); Mark Harris, Woodlawn (CA)

(72) Inventors: Frank Jones, Carp (CA); Mark Harris, Woodlawn (CA)

(*) Notice: Subject to any disclaimer, the term of this patent is extended or adjusted under 35 U.S.C. 154(b) by 0 days.

(21) Appl. No.: 15/742,639

(22) PCT Filed: Jul. 6, 2016

(86) PCT No.: PCT/CA2016/000189
§ 371 (c)(1),
(2) Date: Jan. 8, 2018

(87) PCT Pub. No.: WO2017/004695
PCT Pub. Date: Jan. 12, 2017

(65) Prior Publication Data
US 2018/0203240 A1 Jul. 19, 2018

Related U.S. Application Data

(60) Provisional application No. 62/188,831, filed on Jul. 6, 2015.

(51) Int. Cl.
*G02B 27/01* (2006.01)
*G02C 5/20* (2006.01)
(Continued)

(52) U.S. Cl.
CPC ..... *G02B 27/0176* (2013.01); *G02B 27/0172* (2013.01); *G02B 27/0179* (2013.01);
(Continued)

(58) Field of Classification Search
CPC ............ G02B 27/0176; G02B 27/0179; G02B 27/0172; G02B 2027/0156;
(Continued)

(56) References Cited

U.S. PATENT DOCUMENTS

2,747,191 A * 5/1956 Hoffmaster ............... A61F 9/06
2/8.1
5,500,953 A * 3/1996 Reuber .................. A42B 3/226
2/15
(Continued)

*Primary Examiner* — Tuyen Tra
(74) *Attorney, Agent, or Firm* — Rosenberg, Klein & Lee (57) ABSTRACT

For users exploiting near-to-eye (NR2I) displays for augmented reality and/or correction of low vision then the user is typically going to wear the immersive or non-immersive NR2I displays for specific tasks, for specific visual environments, etc. and hence there is an issue of repeatedly attaching and removing the NR2I display. Further, in the majority of applications irrespective of whether for short-term, long-term, low vision, augmented reality, etc. there is a conflicting tradeoff between user comfort, ease of attachment, minimizing intrusiveness and aesthetics. Accordingly, a means of pivotably attaching and supporting a NR2I display is provided wherein the pivotable mounts may be permanently attached, attached, or demountably attached to a frame which may include for some user's prescription lenses.

19 Claims, 7 Drawing Sheets

(51) Int. Cl.
*G02C 11/00* (2006.01)
*G02C 7/10* (2006.01)

(52) U.S. Cl.
CPC ............... *G02C 5/20* (2013.01); *G02C 11/10* (2013.01); *G02B 2027/014* (2013.01); *G02B 2027/0138* (2013.01); *G02B 2027/0154* (2013.01); *G02B 2027/0156* (2013.01); *G02B 2027/0178* (2013.01); *G02C 7/10* (2013.01)

(58) Field of Classification Search
CPC .... G02B 2027/0178; G02B 2027/0154; G02B 2027/014; G02B 2027/0138; G02C 3/02; G02C 5/20; G02C 11/10; G02C 7/10
USPC ....................................... 351/41, 44
See application file for complete search history.

(56) References Cited

U.S. PATENT DOCUMENTS

| | | | |
|---|---|---|---|
| 2002/0089639 A1* | 7/2002 | Starner | G02C 9/00 351/57 |
| 2018/0096534 A1* | 4/2018 | Kezele | G02B 27/017 |

\* cited by examiner

METHODS AND DEVICES FOR DEMOUNTABLE HEAD MOUNTED DISPLAYS

CROSS-REFERENCE TO RELATED APPLICATIONS

This application claims priority as a 371 National Phase Application of PCT/CA2016/000189 entitled "Methods and Devices for Demountable Head Mounted Displays" filed Jul. 6, 2016; which itself claims priority from U.S. Provisional Patent Application 62/188,831 entitled "Methods and Devices for Demountable Head Mounted Displays" filed Jul. 6, 2015; the entire contents of both being incorporated herein in their entirety by reference.

FIELD OF THE INVENTION

This invention relates to near-to-eye systems and more particularly to methods and devices for attachment, detachment, positioning and supporting head mounted near-to-eye systems in different environmental lighting conditions.

BACKGROUND OF THE INVENTION

A near-to-eye (or near-eye) (NR2I) display is a wearable device that creates a display in front of the user's field of vision from an electronic display. The display may be transparent such that the viewer can view the external world and the projected electronic display simultaneously or opaque wherein the viewer may directly view the electronic display or a projected electronic display, depending on the application. For example, a transparent display can overlay information and graphics on top on the real world, while an opaque display can provide an immersive theater-like experience. Further NR2I displays may provide information within the full visual field of view of the user or may alternatively provide information within part of the user's field of view.

NR2I displays can be broadly placed in two categories, immersive and see-through. Immersive near-to-eye displays block a user's view of the real world and create a large field of view image, typically 30°-60° degrees for cinema glasses and 90°+ degrees for virtual reality displays. See-through near-to-eye displays leave the user's view of the real world open and create either a transparent image or a very small opaque image that blocks only a small portion of the user's peripheral vision. The see-through category can be further broken down into two applications, augmented reality and smart glasses. Augmented reality headsets typically offer 20°-60° degree fields of view and overlay information and graphics on top of the user's view of the real world. Smart glasses, which is really a misnomer, in contrast typically have a smaller field of view and a display which the user glances at periodically rather than looking through the display continuously.

For users exploiting NR2I displays for augmented reality and/or correction of low vision, then the user is typically going to wear the see-through NR2I displays for specific tasks, for specific visual environments, etc. and hence there is an issue of repeatedly attaching and removing the NR2I device. Further, in the majority of applications irrespective of whether for short-term, long-term, low vision, augmented reality, etc. there is a conflicting tradeoff between user comfort, ease of attachment, minimizing intrusiveness and aesthetics.

In some instances, such as the eSight™ eyewear, the NR2I displays are bioptic such that support user engagement in multiple positions. Accordingly, it would be beneficial to provide designers of NR2I displays with an attachment methodology supporting bioptic near-to-eye displays which provides users with a repeatable, easy and robust attachment which may be employed with a variety of "frames" to reflect users with normal eyesight, users with prescription corrective lenses, etc. Further, NR2I displays when worn in high brightness environments, such as outdoors in sunlight, can be effected by light from the environment. Accordingly, it would be beneficial to provide methods to reduce the effect of or compensate for the effect of the environmental light on the user's ability to view the NR2I displays.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to near-to-eye systems and more particularly to methods and devices for attachment, detachment, positioning and supporting head mounted near-to-eye systems in different environmental lighting conditions.

In accordance with an embodiment of the invention there is provided a method of attaching and pivoting a bioptic head mounted display (HMD) system to a frame worn by a user comprising:
providing a first sub-assembly comprising:
  providing a frame to be worn by the user to which the HMD is attached comprising at least a temple arm;
  providing a first magnet retained at a predetermined point upon the temple arm; and
providing a second sub-assembly comprising:
  providing a second magnet allowing the second sub-assembly to be demountably attached to the frame;
  providing an attach guide within which the second magnet is retained and which mounts to the frame in a predetermined orientation at the predetermined point upon the temple arm; and
  a HMD mounting pivotally attached to the body for attaching to the HMD and allowing the HMD to be pivoted relative to the frame.

In accordance with an embodiment of the invention there is provided a bioptic HMD system comprising:
a near-to-eye (NR2I) display system attached to a frame to be worn by a user, wherein the NR2I display system pivots about bioptic pivot locations on each arm of the frame;
a front weight relieving band attached to the bioptic pivot locations for operably engaging in a deployed position with the forehead of the wearer;
a rear weight relieving band attached to the bioptic pivot locations; wherein
the front weight relieving band may be stowed behind the inner surface of NR2I display when not in use and deployed by pivoting it so that it is above the NR2I display when worn by the user.

In accordance with an embodiment of the invention there is provided a pair of sunglasses comprising:
a frame comprising at least a nose bridge and a pair of bioptic head mounted display (HMD) mounts;

at least a lens vertically divided into a plurality of regions with different optical transmission performance in each region; and at least a baffle comprising at least one of an upper surface, a lower surface, and a side surface to the outside of the frame, wherein each of the upper surface, the lower surface, and the side surface has a predetermined optical transmission performance.

In accordance with an embodiment of the invention there is provided a mounting comprising:

a first sub-assembly comprising:
  a frame to be worn by the user to which the HMD is attached comprising at least a temple arm;
  a first magnet retained at a predetermined point upon the temple arm; and
a second sub-assembly comprising:
  a second magnet allowing the second sub-assembly to be demountably attached to the frame;
  an attach guide within which the second magnet is retained and which mounts to the frame in a predetermined orientation at the predetermined point upon the temple arm; and
  a HMD mounting pivotally attached to the body for attaching to the HMD and allowing the HMD to be pivoted relative to the frame.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is directed to near-to-eye systems and more particularly to methods and devices for attachment, detachment, positioning and supporting head mounted near-to-eye systems in different environmental lighting conditions.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "head mounted NR2I display" (HMD) as used herein and throughout this disclosure refers to a wearable device that incorporates an image presentation device operating in conjunction with a microprocessor such that a predetermined portion of an image may be presented to the user on the image presentation device (NR2I display). The image presentation device is typically an LCD display, LED display, or OLED display although any display generation device capable of being mounted and supported as part of a HMD may be considered. As noted supra a HMD may be configured as immersive, wherein the user views the display absent any direct external visual view, or non-immersive, wherein the user views the display with direct external visual view. Configurations of HMD and their associated NR2I display may include immersive with direct viewer viewing of NR2I display, immersive with indirect viewer viewing of NR2I display through an intermediate optical assembly, non-immersive with direct viewer viewing of NR2I display which is substantially transparent, immersive with indirect viewer viewing of NR2I display through an intermediate optical assembly. Optical sub-assemblies for indirect viewer viewing of the NR2I display may employ the NR2I display to the sides of the viewer's head or above the viewers eyeline. Non-immersive configurations may employ a non-transparent display or optical assembly where the display presents to a smaller field of view than the user's full field of view or is within their peripheral vision such that it does not overlay the central portion of their field of view. A HMD may be monocular or binocular.

The image presented to the user upon a NR2I display and its associated HMD may be acquired from a camera also forming part of the HMD or a camera associated with the user such as through a remotely attached camera for example. Alternatively, the image(s)—video content may be acquired from a portable electronic device, a fixed electronic device, a cable set-top box, satellite set-top box, or any video source. The image presented to the user may be as directly acquired, processed to fit display, etc. or aligned to elements within the field of view based upon image processing such that, for example, a schematic overlay may be aligned to a circuit being worked upon by the user. Within other embodiments of the invention the image may be processed to augment/enhance the visual perception of the user.

The microprocessor together with any other associated electronics including, but not limited to, memory, user input device, gaze tracking, context determination, graphics processor, and multimedia content generator may be integrated for example with the HMD, form part of an overall assembly with the HMD, form part of the PED, or as discrete unit wirelessly connected to the HMD and/or PED. Accordingly, for example, the NR2I displays may be coupled wirelessly to the user's PED whereas within another embodiment the HMD may be self-contained.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, smart glasses, environmental sensors, medical sensors, biological sensors, physiological sensors, chemical sensors, ambient environment sensors, position sensors, and motion sensors.

A "wearer", "user" or "patient" as used herein and through this disclosure refers to, but is not limited to, a person or individual who uses the HMD either as a patient requiring visual augmentation to fully or partially overcome a vision defect or as an ophthalmologist, optometrist, optician, or other vision care professional preparing a HMD for use by a patient. A "vision defect" as used herein may refer to, but is not limited, a physical defect within one or more elements of a user's eye, a defect within the optic nerve of a user's eye, a defect within the nervous system of the user, a higher order brain processing function of the user's eye, and an ocular reflex of the user. A "wearer" or "user" may also be an individual with healthy vision, using the HMD in an application other than for the purposes of ameliorating physical vision defects. Said applications could include, but are not necessarily limited to gaming, augmented reality, night vision, computer use, viewing movies, environment simulation, etc. Augmented reality applications may include, but are not limited to, medicine, visual assistance, engineering, aviation, tactical, gaming, sports, virtual reality, environment simulation, and data display.

1. Design Environment

The design domain for the inventors relates to near-to-eye displays, near-to-eye head mounted displays, and see-though near-to-eye displays which are referred to as head mounted NR2I displays or HMDs within this specification.

Multiple design factors were considered by the inventors including:

- Ability to support a continuous adjustment range within bioptic pivot HMDs;
- Ability to support ophthalmic frames and lenses for users which may be used with and without the HMD;
- Ability to support a range of ophthalmic frames and carriers including "lens-less" carrier, prescription carrier and sunglasses (prescription or non-prescription);
- HMD must be easily donned and removed by user wearing the ophthalmic frame;
- HMD weight bearing features built exclusively into HMD; and
- Ophthalmic frame has a HMD adaptor that is also pivot mechanism.

2. Bioptic Head Mounted Displays

Figure 1:
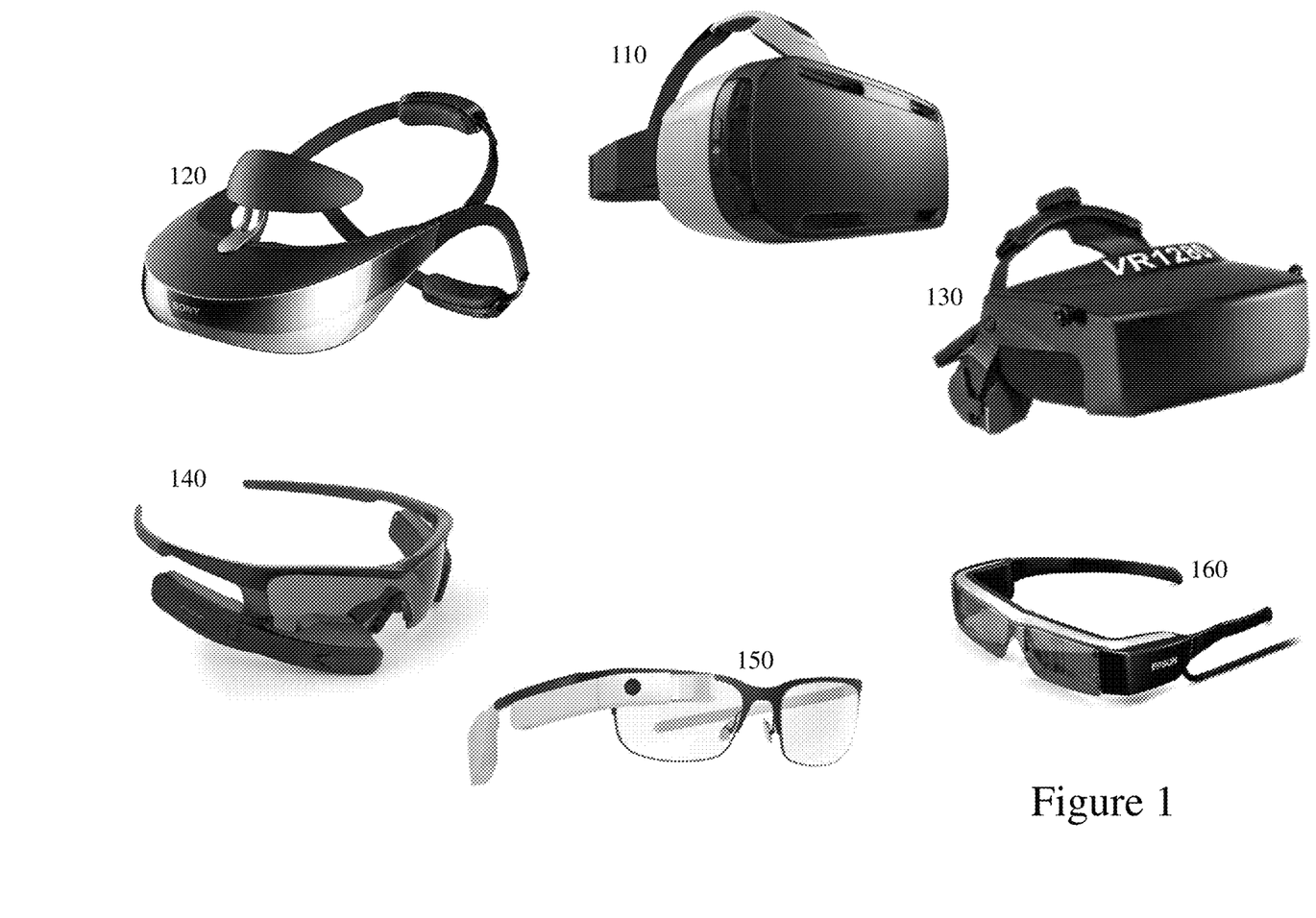
FIG. 1 depicts prior art immersive and augmented reality head mounted displays (HMDs)

Within the prior art in respect of head mounted NR2I displays (HMDs) have typically been geared to immersive use, e.g. the user sees only the images projected onto the display or towards augmented reality wherein the user views the real world and is presented additional information through the HMD. Examples of such immersive HMDs include Oculus Gear™ 110 by Oculus™ in conjunction with Samsung™, the HMZ-T3W 120 by Sony™, and the Virtual Research (VR) 1280 130 by Panou™. Examples, of HMDs within the augmented reality/non-immersive category are devices such as Recon Jet™ 140 by Recon™, Google Glass 150 by Google, and Moverio™ BT-200 160 by Epson™. In the former immersive HMDs, the user views the display directly or displays directly and exclusively, whilst in the latter the user views the additional information as an overlay presented in addition to the user's native vision through a typically smaller display projected onto a smaller region of the user's retina.

All of these systems involve an optical train comprising at least the display and pupil of the user. Except in the most basic HMD system with just these two elements then additional optical elements are disposed within the optical train. These optical elements may include, but not limited to, corrective prescription glasses, contact lenses, a camera acquiring an image for display to the user, and one or more lenses and/or prisms disposed within the optical train. Accordingly, aberrations such as distortions and chromatic effects will require consideration and addressing in order to provide an optimal visual stimulus to the user. For example, within systems that place the displays in front of the users eyes such as Oculus Gear™ 110 then a pair of lenses provide slightly different views of the same display to the user to trigger depth perception whilst the Sony HMZ-T3W exploits a pair of lenses disposed between the user's pupils and the two display screens. In contrast, the Moverio™ BT-200 160 in common with HMDs accordingly established by the inventors at eSight Inc. exploit projection optics through which the user views the world and onto which the augmented images and/or augmentation content are projected from optical displays mounted in the sides of the HMD such as with the Moverio™ BT-200 and eSight™ Generation 3 HMD or in the upper portion of the HMD projecting down such as with the Generation 1 and Generation 2 HMD from eSight™. Other side mounted displays exploit a variety of optical elements to re-direct the optical path from display to eye including, but not limited to, curved mirror (e.g., Vuzix™), diffractive waveguide (e.g. Nokia™ and Vuzix™), holographic waveguide (e.g. Sony and Konica-Minolta), polarized waveguides (e.g. Lumus), and reflective waveguides (e.g. Epson, Google, eSight).

Figure 2:
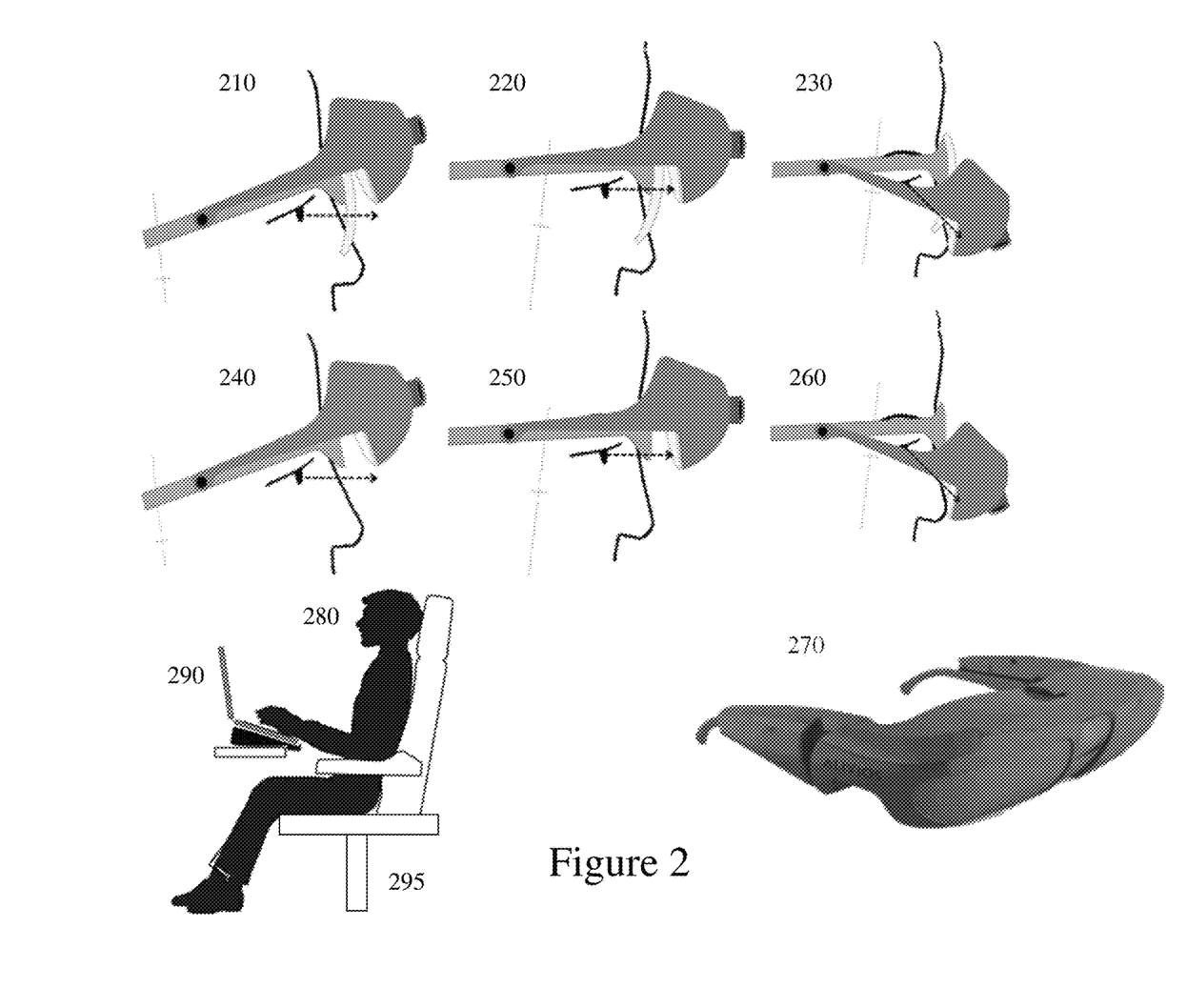
FIG. 2 depicts a bioptic head mounted NR2I display (HMD) according to the prior art which may be augmented with embodiments of the invention.

Having been conceived and developed from the viewpoint of augmenting the vision of low vision users then eSight™ HMDs, such as eSight 270 depicted in FIG. 2, fully support users with and without refractive correction lenses and a bioptic environment. This being evident in FIG. 2 where first to third schematics 210 to 230 respectively present three bioptic configurations in the instance the user wears corrective lenses whilst fourth to sixth schematics 240 to 260 respectively present the same three bioptic configurations for a user without lenses. Accordingly, a user 280 working with a laptop computer 290 would typically be sitting with their head in orientations depicted in second, third, fifth, or sixth schematics 220, 230, 250 and 260 respectively wherein the HMD is engaged. In this instance the laptop computer 290 may establish a direct WPAN or wired link to the HMD 270 thereby displaying the images to the user which would otherwise be displayed on the screen of the laptop computer. In some instances, the laptop computer 290, due to typically increased processing resources compared to HMD 270 or a PED to which the HMD 270 is connected, may have software in execution thereon to take over processing from the HMD 270 or PED. If the user tilts their head backwards with a weighted HMD bioptic system, then the HMD pivots out of the way as depicted in first and third schematics 210 and 240 respectively. Optionally, the HMD is manually pivoted out of the user's line of sight but they may still view the display by glancing upwards. In the third and sixth schematics 230 and 260 the user has tilted their head forward to view something wherein a camera within the HMD may tilt and/or zoom to provide a different viewpoint or alternatively the image is processed further to provide equivalent tilt/zoom functionality. Accordingly, in the different configurations the user may view the HMD itself in different orientations either directly without refractive correction lenses or through different regions of their refractive correction lenses.

3. Attach and Pivot

Figure 3A:
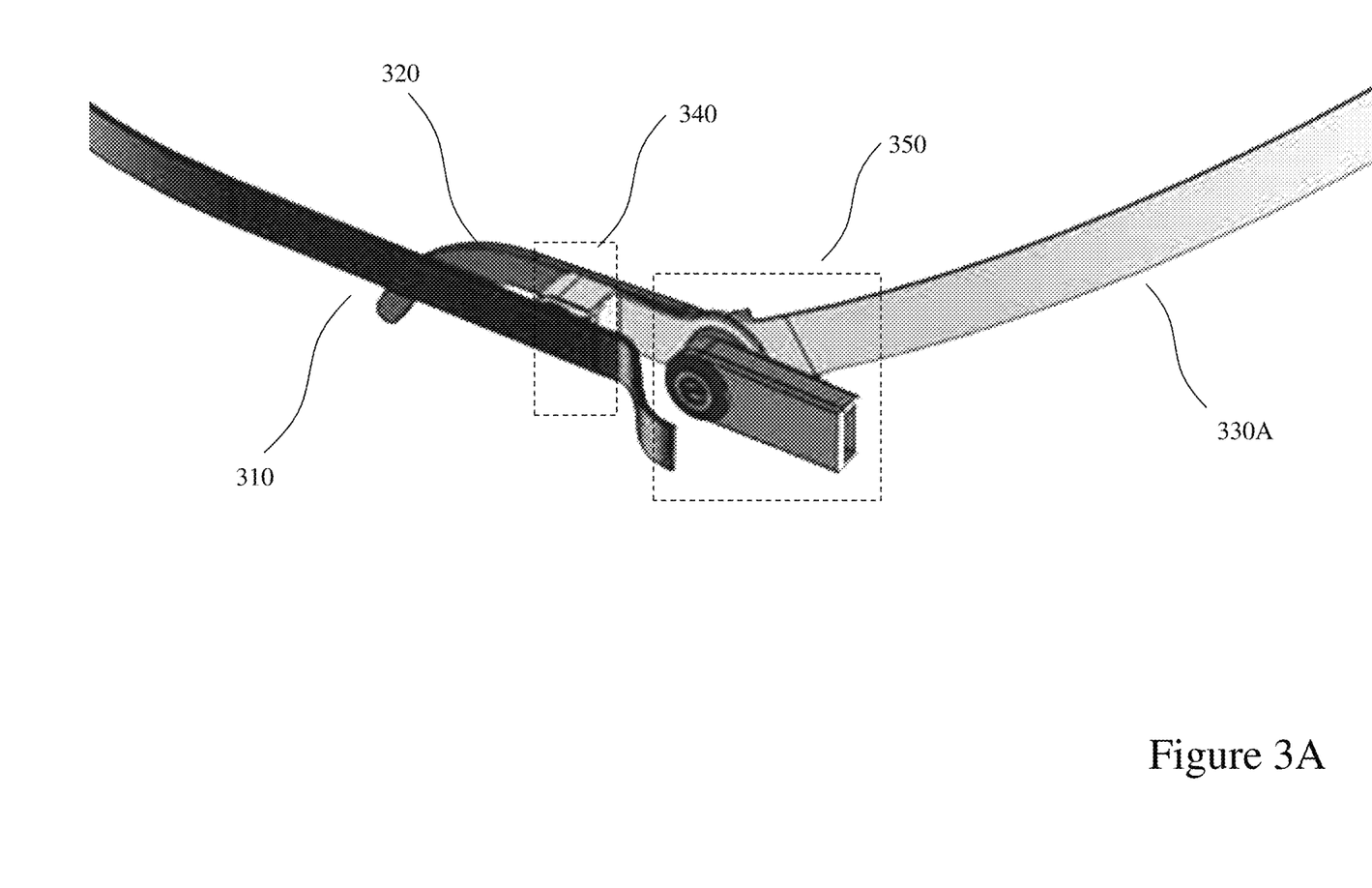
FIGS. 3A and 3B depict a HMD mounting according to an embodiment of the invention in the forehead band deployed and stored positions respectively.
Figure 3B:
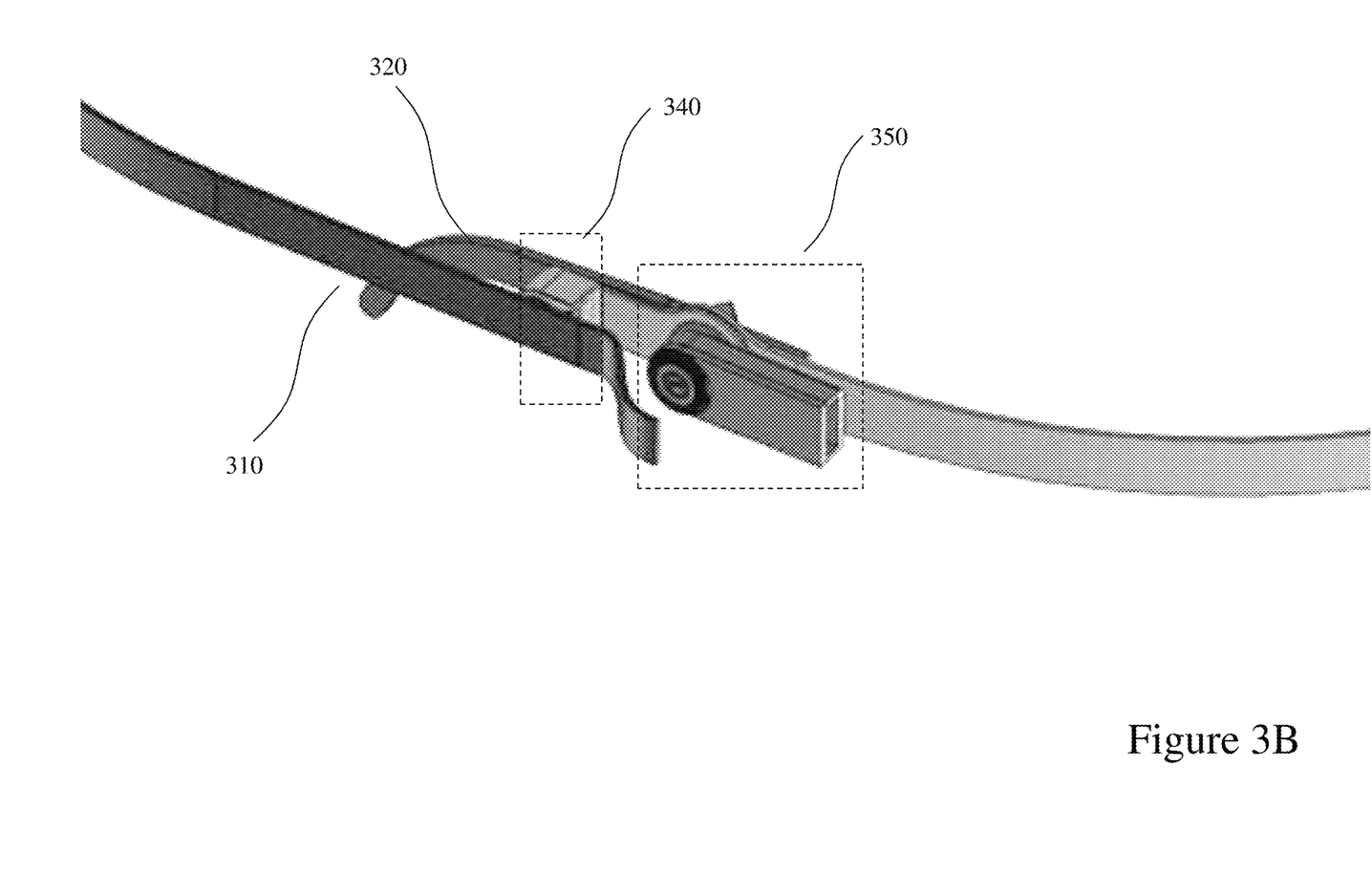

Referring to FIGS. 3A and 3B respectively these depict a HMD mounting according to an embodiment of the invention wherein a forehead band is depicted in deployed and stored positions respectively. In FIGS. 3A and 3B the HMD mounting is depicted without the HMD and/or prescription lenses etc. for clarity. Further, only a portion of a temple arm is depicted. As depicted it comprises Rear strap 310;
Temple arm 320;
Forehead band 330 in "up" or "deployed" position in FIG. 3A and "down" or "stored/stowed" position in FIG. 3B;
Strap attachment means 340; and
HMD pivot and attachment means 350.

With respect to weight-relieving features for HMD wearers/users then the front forehead band attaches at the same pivot location as HMD attaches. The forehead band 330 can pivot from a "stored/stowed" position as depicted in FIG. 3B wherein it sits behind and below the top of the HMD to an "open/deployed" position as depicted in FIG. 3A where it fits around the user's forehead supporting the HMD which is otherwise front-heavy, in general, and hence would primarily be supported by the bridge of the wearer's nose for example through the frame, not shown for clarity, of which temple arm 320 forms part. However, it would be evident that with the forehead band 330 HMDs may be supported without a substantial weight on the user's nasal bridge and in some embodiments the temple arms may be linked without a nasal bridge.

The forehead band 330 as depicted in FIGS. 3A and 3B attaches at the same pivot location as the HMD pivot and attachment means 350. In contrast the rear strap 310 attaches at a different location and is intended to relieve the HMD weight via the back of the wearer's head. Properly fitted front and rear headbands would transfer a significant portion of the weight being supported away from the wearer's nasal bridge and ear(s). Optionally, the forehead band 330 may attach and pivot at the same mounting point as the rear strap 310 through appropriate modification of the portion of the strap attachment means 340 or within another embodiment of the invention the strap attachment means 340 may be combined with a modified HMD pivot and attachment means 350.

It would be evident that the strap attachment means 340 may be designed to be an integral portion of the temple arm 320 and therein a frame for the HMD that may or may not include prescription lens(es) for the user. Alternatively, the strap attachment means 340 may be designed to be attached to a frame for eyeglasses as a discrete element or alternatively the strap attachment means 340 and HMD pivot and attachment means 350 may be designed as a single piece part with a common back plate rather than the temple arm 320 and this common back plate is then attachable to an eyewear frame allowing the user to have a pair of eyeglass frames to which the user can add/remove the HMD and the rear strap 310. In this manner a user may have multiple eyeglasses frames, e.g. reading glasses, normal glasses, prescription sunglasses, etc. and have each fitted with the common back plate with its associated variants of the strap attachment means 340 and HMD pivot and attachment means 350 such that in each instance they can add or remove the HMD or even within other embodiments of the invention different HMDs having different characteristics/camera/etc.

Optionally, the front headband may be padded over the forehead region with an elastomer, rubber, foam or other material(s) discretely or in combination. Optionally, the front headband is formed from a resilient, flexible material which may, for example, be a polymer, cellulose acetate propionate, nylon, cellulose acetate, polyvinyl chloride, acrylics, polyesters, silicones, polyurethanes, and halogenated plastics either directly or modified with the addition of one or more plasticizers. Optionally, the front headband is sized for the user or may include a means of adjustment.

Optionally, the rear band is formed from a resilient, flexible material such as noted supra in respect of the front headband. Optionally, the rear headband may be formed from an elastic or elasticated material such as one including or formed from neoprene, butyl rubber, a silicone rubber, polyisoprene, buna, etc. Similarly, the rear headband may be sized for the user with some elasticity, include a means of adjustment with some elasticity, have a high degree of elasticity, or have minimal elasticity and means of adjustment.

The rear headband may be attached on one side to a pivot location on a permanent or semi-permanent basis. Optionally, the rear headband may be attached on both sides to pivot locations on a permanent or semi-permanent basis. Optionally, the rear headband may be attached on the other side of a permanent or semi-permanent attachment or on both sides via a magnetically guided clip or an alternate quick attach-release mechanism as known within the art.

A user may, in some embodiments of the invention, don the unit by slipping the attached front and rear headbands over their head and snapping the HMD unit onto their ophthalmic frame or by snapping the HMD unit onto their ophthalmic frame then attaching the previously unattached rear strap using the magnetic guided clip. Optionally, the rear band may be adjusted by user using a typical strap length control piece whilst the front headband may be adjusted by user by pivoting to the best location and by attaching optional adhesive foam strips of different thicknesses. Optionally, the front and rear headbands may be designed as discussed below in respect of the overall assembly for relatively simple replacement such that these are consumable items to allow for replacement as they wear, absorb moisture, etc.

Figure 4:
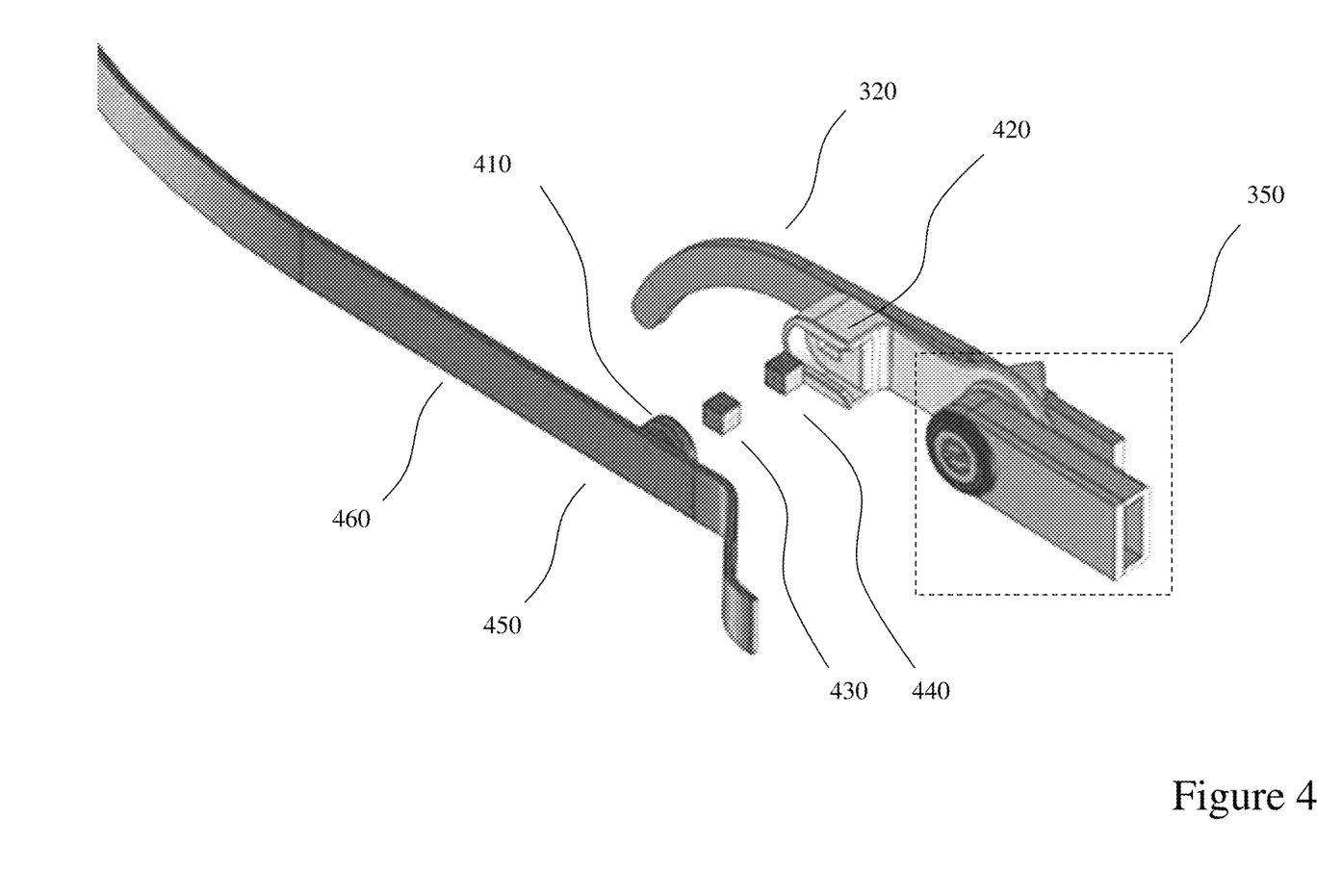
FIG. 4 depicts an exploded view of the rear strap attachment for a HMD mounting according to an embodiment of the invention.

Now referring to FIG. 4 there is depicted an exploded assembly schematic of the strap attachment means 340 in FIGS. 3A and 3B. As depicted the rear strap, e.g. rear strap 310 in FIGS. 3A and 3B respectively, comprises a main portion 460 which runs around the back of the wearer's head and an adjustment region 450. The rear strap at either end has a first fitting 410 within which is a first magnet 430. This couples to a second magnet 440 which is retained within a second fitting 420 attached to the temple arm 320 and forming part of the strap attachment means 340. In this manner the wearer can rapidly attach the main portion 460 to the temple arm 320 and then attach the HMD, not shown for clarity. The first and second magnets 430 and 440 respectively may be retained within their respective first and second fittings 410 and 420 either by physical means, e.g. the magnets are pushed into receptacle portions of the elements or they may be retained via epoxy, glue, etc. or other means as known in the art.

Figure 5:
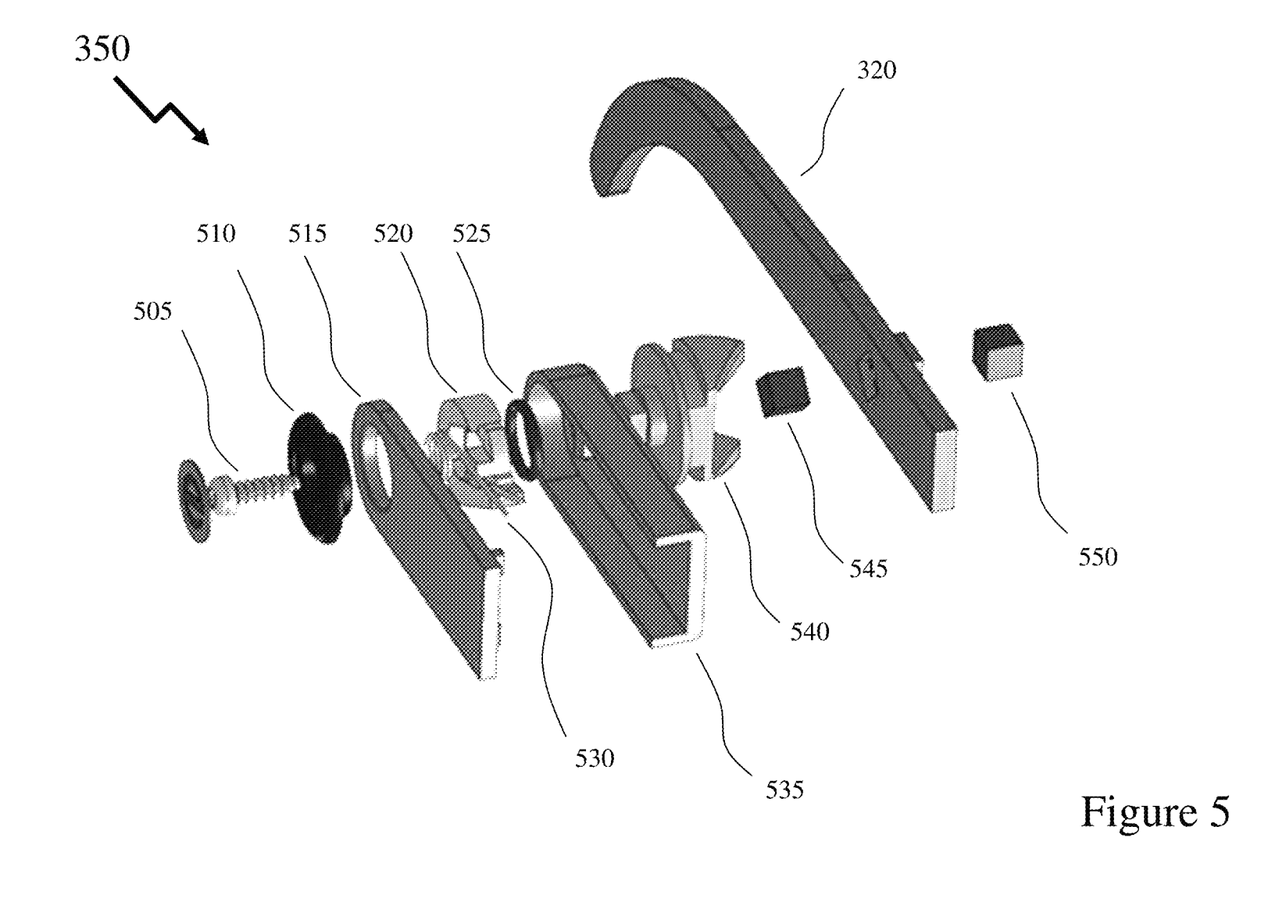
FIG. 5 depicts an exploded view of a HMD tilt and frame attachment forming part of a HMD mounting according to an embodiment of the invention.

Now referring to FIG. 5 there is depicted an exploded assembly schematic of the HMD pivot and attachment means 350 with the second fitting 420 and remainder of the strap attachment means 340 omitted for clarity. Within this embodiment of the invention the temple arm 320 has a third magnet 550 retained within it, towards the wearer's temple. The other side of the temple arm 320 to the third magnet 550 has a key engagement zone designed to engage with fourth magnet 545 which is then retained within a fluted attach guide 540. Sequentially attached to the fluted attach guide 540 by a retaining bolt 505, in order away from the fluted attach guide 540 and the wearer's head, are first HMD arm section 535, O-ring 525, tilt damping and support mechanism 520, spring 530, second HMD arm section 515, and retaining washer 510. Accordingly, these elements when assembled provide a mounting for the HMD, this mounting being formed from first and second HMD arm sections 535 and 515 respectively wherein the mounting can rotate via the tilt damping and support mechanism 520 which has upper and lower travel limits defined through design and the tilt damping and support mechanism 520/spring 530 mounting to the fluted attach guide 540 which is keyed to the temple arm 320 via the fourth magnet 545 and the key engagement zone.

Accordingly, the HMD mates to the frame using magnets on each side of the mounting. The third magnet 545 is shaped in order to capture the spring 530 and accordingly this aids counter-balancing the HMD weight. As depicted the third magnet is cube shaped although other shapes may be employed provided that they can key/capture the spring. As such cylindrical magnets would not provide the required keying function. Whilst the first and second HMD arm sections 535 and 515 respectively are depicted as forming a rectangular receptacle for the HMD it would be evident that other geometries may be employed. Further, whilst the first and second HMD arm sections 535 and 515 respectively are depicted without features internally where the HMD attaches it would be evident that within other embodiments of the invention that the receptacle formed by the first and second HMD arm sections 535 and 515 respectively may have one portion of a latching mechanism wherein the second portion is part of the HMD such that the HMD may be demountably latched.

Within other embodiments of the invention the mounting between the HMD and the HMD pivot and attachment means 350 depicted in FIG. 5 may be an interference fit, a fit with screw attachment (e.g. through a knurled knob or equivalent). Further within other embodiments of the invention the third magnet 550 and the fourth magnet 545 may be disposed on the same side of the frame, e.g. the outside relative to the user's head.

The fluted attach guide 540 employs a fluted aperture in order to guide the mounting process and assist the user in mounting HMD to frame. Accordingly, the magnets "snap" the HMD to the temple arm 320, which may or may not have prescription glasses as part, in keyed fashion aided by fluted guide.

As depicted the HMD mount exploits a pivot using a spring 530 to counter-balance the HMD weight and an O-ring 525 to provide friction/dampening when the HMD is moving but also allowing the HMD to remain in the location the user selects within pivot range. Optionally, the O-ring 525 may be replaced by another element that provides the same characteristics in terms of friction between surfaces and compliance.

Optionally, rather than having a continuous setability within the range defined by the design of the HMD pivot and attachment means the design may provide for a limited number of HMD positions, e.g. 2, 3, 4, 6, etc. Optionally, the number of HMD positions may be defined by a specific sub-assembly or alternatively through the design of the HMD pivot and attachment means 350 the user may be able to define a number of positions and/or set the position for each of a small number of positions to their particular preference.

Figure 6:
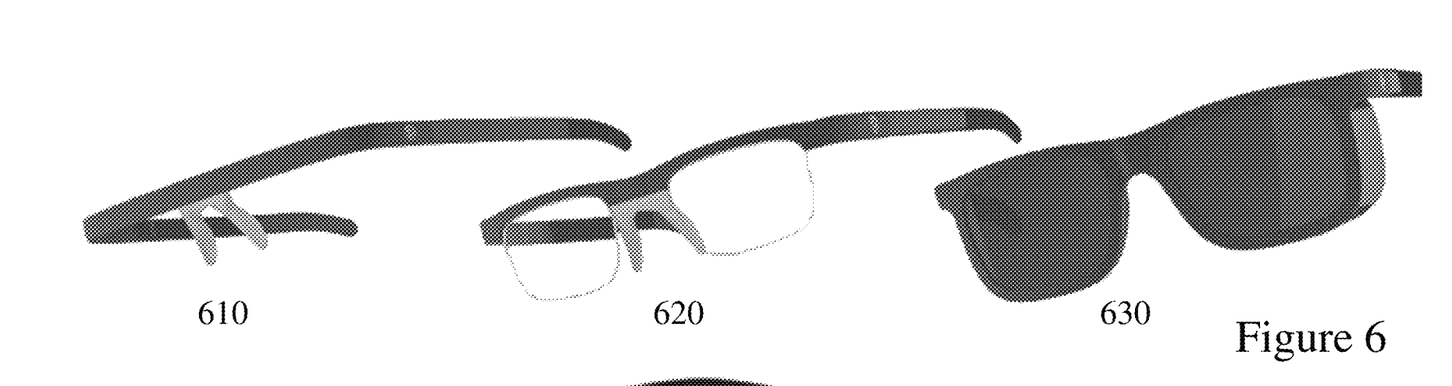
FIG. 6 depicts carrier frames for supporting HMD mountings according to embodiments of the invention.

Now referring to FIG. 6 there are depicted first to third frames 610 to 630 respectively representing:

First frame 610 which is lens-less and comprises frame arms and nose bridge;

Second frame 620 representing a lensed frame with one or two lenses, e.g. prescription lenses, in addition to the frame arms and nose bridge; and Third frame 630 representing sunglasses with baffling and including the frame arms and nose bridge.

Commonly, sunglasses include temple arms, a frame and a pair of lenses. Some have a single lens to cover both eyes. In some instances, the lenses may be prescription lenses. Mostly, sunglasses do not also baffle light around their edges. Some types of sun shield applications do have a baffling function such as ski goggles and mountaineering glasses. Baffling may be integrated (as in ski goggles) or an accessory that is attached (as in some types of mountaineering glasses).

HMD systems present unique challenges when being worn outside. On the one hand the user needs to see the display without blocking a significant percentage of light from the display, but on the other there is a need to block external light under some circumstances such as those with particularly high brightness arising from direct or reflected sunlight.

A light blocking filter with or without polarization is commonly used in sunglasses lenses and in some cases a side lens is used to block additional light while allowing peripheral vision. However, when baffling is used it blocks peripheral light, including important side and bottom peripheral light required to aid basic human walking and navigation.

Figure 7:
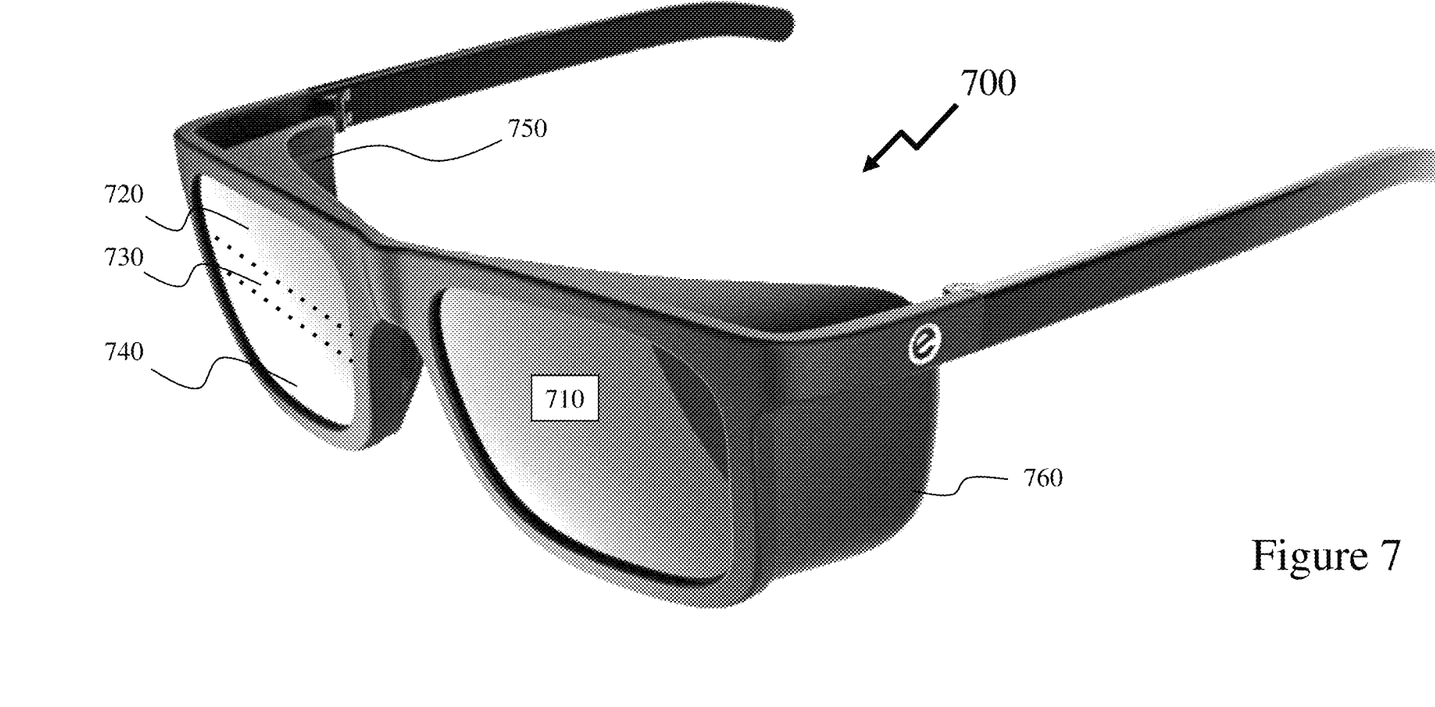
FIG. 7 depicts sunglasses supporting HMD mountings according to an embodiment of the invention.

Accordingly, referring to FIG. 7 there are depicted a pair of sunglasses 700 providing several key features as appropriate for use in conjunction with a see-through near-to-eye display. Each lens 710 comprises an upper high percentage light transmission area 720 for HMD screen viewing, a lower low percentage light transmission area 740 to limit external light and a graded region 730 graduating between the low and high light transmission areas. The lenses 710 may be in prescription or non-prescription form. Disposed on the outer edges of each lens 710 are baffles which on the upper baffle surfaces 750 are opaque or low transmission whilst side and bottom surfaces, of which only side baffle surface 760 is evident are low transmission in order to aid peripheral vision. It would be evident that the HMD is intended to mount externally to the sunglasses 700.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A bioptic HMD system comprising: a near-to-eye (NR2I) display system attached to a frame to be worn by a user, wherein the NR2I display system pivots about bioptic pivot locations on each arm of the frame; a front weight relieving band attached to the bioptic pivot locations for operably engaging in a deployed position with the forehead of the wearer; a rear weight relieving band attached to the bioptic pivot locations; wherein the front weight relieving band is stowed behind the inner surface of NR2I display when not in use and deployed by pivoting the NR2I display system so that the front weight relieving band is above the NR2I display when worn by the user, wherein the frame is an eyewear frame comprising at least a prescription lens.

2. The bioptic HMD system according to claim 1, wherein
the rear band is demountably attached to one or both sides; and
the one or more demountable attachments are magnetic catches with mechanical guiding elements.

3. The bioptic HMD system according to claim 1, wherein the bioptic HMD system provides for at least two of:
the user to view their environment with the bioptic HMD system in a first position such that the bioptic HMD is pivoted upwards;
the user to view first digital content presented on the bioptic HMD with their head in a second position such that the HMD is pivoted down in front of their eyes;
the user to view second digital content presented on the bioptic HMD with their head in a third position such that the HMD is pivoted further down in front of their eyes than when their head is in the second position.

4. The bioptic HMD system according to claim 1, wherein the bioptic HMD system allows the user to:
position the bioptic HMD system in a first position such that the user can view their environment, wherein the first position is with the bioptic HMD system pivoted upwards out of their line of sight;
position the bioptic HMD system in a second position such that the user can view first digital content presented on the bioptic HMD system with their head in a first position such that the HMD is pivoted down in front of their eyes; and
position the bioptic HMD system in a third position such that the user can position the bioptic HMD system to any position between that when it is pivoted upwards and that when it pivoted down in front of their eyes.

5. The bioptic HMD system according to claim 1, wherein the bioptic HMD system:
positions itself into a first position pivoted upwards out of the user's line of sight when their head is in a first position;
positions itself into a second position pivoted down in front of their eyes when the user's head in a second position allowing them to view first digital content presented on the bioptic HMD system; and
positions itself into a third position pivoted further down in front of their eyes when the user's head in a third position allowing them to view second digital content presented on the bioptic HMD system.

6. The bioptic HMD system according to claim 1, wherein
the NR2I display system attached to both sides; and
the NR2I display system is attached with mechanical guiding elements.

7. The bioptic HMD system according to claim 1, wherein
the NR2I display system attached to both sides; and
the NR2I display system is attached with mechanical guiding elements such that a distance between the NR2I display system and a front of a face of the wearer can be adjusted.

8. The bioptic HMD system according to claim 1, wherein each bioptic pivot location comprises a washer, a tilt damping and support means, and a spring, wherein
the tilt damping and support means sets the limits of pivotable motion of the second sub-assembly relative to the first sub-assembly and mounts in fixed orientation upon an attachment guide;
the spring engages the HMD mounting and the tilt damping and support means; and
the washer provides frictional retention of the HMD mounting against the tilt damping and support means.

9. The bioptic HMD system according to claim 1, wherein the bioptic HMD system provides for at least two of:
the user to view their environment with their head in a first position wherein the bioptic HMD is pivoted upwards out of their line of sight;
the user to view first digital content presented on the bioptic HMD with their head in a second position such that the HMD is pivoted down in front of their eyes; and
the user to view second digital content presented on the bioptic HMD with their head in a third position such that the HMD is pivoted further down in front of their eyes than when their head is in the second position.

10. The bioptic HMD system according to claim 1, further comprising
a lens vertically divided into a plurality of regions with different optical transmission performance in each region; and
a baffle comprising at least one of an upper surface, a lower surface, and a side surface; wherein
the upper surface has a first predetermined optical transmission performance;
the lower surface has a second predetermined optical transmission performance; and
the side surface has a third predetermined optical transmission performance.

11. The bioptic HMD system according to claim 10, wherein
the at least a lens is attached to the frame such that when the bioptic HMD system is worn by the user the lens is disposed in front of an eye of the wearer; and
the at least a baffle is attached to the frame such that when the bioptic HMD system is worn by the user the side surface is disposed to one side of a head of the wearer.

12. The bioptic HMD system according to claim 10, wherein
a first uppermost region of the lens has high optical transmission within the visible wavelength range;
a second lowermost region of the lens has low optical transmission within the visible wavelength range; and
a third central region of the lens graduates in optical transmission for the high optical transmission of the first uppermost region to the low optical transmission of the second lowermost region.

13. The bioptic HMD system according to claim 10, wherein
- the upper surface has low optical transmission within the visible wavelength range;
- the lower surface and side surface each have high optical transmission within the visible wavelength range.

14. The bioptic HMD system according to claim 1, further comprising
- a pair of lenses each vertically divided into a plurality of regions with different optical transmission performance in each region; and
- a pair of baffles each comprising at least one of an upper surface, a lower surface, and a side surface; wherein
- the upper surface has a first predetermined optical transmission performance;
- the lower surface has a second predetermined optical transmission performance; and
- the side surface has a third predetermined optical transmission performance.

15. The bioptic HMD system according to claim 14, wherein
- a first lens of the pair of lenses is attached to the frame such that when the bioptic HMD system is worn by the user the lens is disposed in front of a left eye of the wearer;
- a second lens of the pair of lenses is attached to the frame such that when the bioptic HMD system is worn by the user the lens is disposed in front of a right eye of the wearer;
- a first baffle of the pair of baffles is attached to the frame such that when the bioptic HMD system is worn by the user the side surface is disposed to a left hand side of a head of the wearer; and
- a second baffle of the pair of baffles is attached to the frame such that when the bioptic HMD system is worn by the user the side surface is disposed to a right hand side of a head of the wearer.

16. The bioptic HMD system according to claim 14, wherein
- a first uppermost region of each lens of the pair of lenses has high optical transmission within the visible wavelength range;
- a second lowermost region of each lens of the pair of lenses has low optical transmission within the visible wavelength range; and
- a third central region of each lens of the pair of lenses graduates in optical transmission for the high optical transmission of the first uppermost region to the low optical transmission of the second lowermost region.

17. The bioptic HMD system according to claim 14, wherein
- the upper surface of each baffle of the pair of baffles has low optical transmission within the visible wavelength range;
- the lower surface and side surface of each baffle of the pair of baffles each have high optical transmission within the visible wavelength range.

18. The bioptic HMD system according to claim 1, wherein
- the frame comprises a pair of first sub-assemblies each disposed to a side of a head of the wearer when the bioptic HMD system is worn by the wearer and comprising a first part of an attachment means for the NR2I display system to the frame;
- the NR2I display system comprises a pair of second sub-assemblies each comprising:
  - a second part of an attachment means for the NR2I display system to the frame;
  - an attach guide within which the second part of the attachment means is retained and which mounts to the frame in a predetermined orientation at the predetermined point upon the frame; and
  - a HMD mounting pivotally attached to the body for attaching to the HMD and allowing the HMD to be pivoted relative to the frame.

19. The bioptic HMD system according to claim 18, wherein
- the first part of the attachment means for the NR2I display system to the frame is a first magnet;
- the second part of the attachment means for the NR2I display system to the frame is a second magnet allowing the second sub-assembly to be demountably attached to the frame.

* * * * *